United States Patent
Barthelme et al.

(10) Patent No.: US 10,113,634 B2
(45) Date of Patent: Oct. 30, 2018

(54) DEVICE INCLUDING ONE FIRST AND AT LEAST ONE SECOND BEARING

(71) Applicants: Juergen Barthelme, Frankenwinheim (DE); Alexander Dilje, Schweinfurt (DE); Helmut Hauck, Euerbach (DE); Stefanie Seufert, Rothhausen (DE)

(72) Inventors: Juergen Barthelme, Frankenwinheim (DE); Alexander Dilje, Schweinfurt (DE); Helmut Hauck, Euerbach (DE); Stefanie Seufert, Rothhausen (DE)

(73) Assignee: AKTIEBOLAGET SKF, Gothenburg (SE)

(*) Notice: Subject to any disclaimer, the term of this patent is extended or adjusted under 35 U.S.C. 154(b) by 87 days.

(21) Appl. No.: 15/196,601

(22) Filed: Jun. 29, 2016

(65) Prior Publication Data

US 2017/0002868 A1    Jan. 5, 2017

(30) Foreign Application Priority Data

Jul. 2, 2015   (DE) ........................ 10 2015 212 437

(51) Int. Cl.
| | |
|---|---|
| F16C 35/077 | (2006.01) |
| F16C 43/04 | (2006.01) |
| F16H 57/021 | (2012.01) |
| F16C 19/54 | (2006.01) |
| F16C 35/067 | (2006.01) |
| F16C 19/06 | (2006.01) |
| F16C 19/26 | (2006.01) |

(52) U.S. Cl.
CPC ........... *F16H 57/021* (2013.01); *F16C 19/54* (2013.01); *F16C 35/067* (2013.01); *F16C 19/06* (2013.01); *F16C 19/26* (2013.01)

(58) Field of Classification Search
CPC ........ F16C 19/26; F16C 19/54; F16C 19/541; F16C 19/546; F16C 33/045; F16C 33/077; F16H 57/021
See application file for complete search history.

(56) References Cited

U.S. PATENT DOCUMENTS

| | | | | |
|---|---|---|---|---|
| 6,408,519 | B1* | 6/2002 | Beyfuss | F16C 19/54 29/521 |
| 8,485,731 | B2* | 7/2013 | Beyfuss | F16C 19/54 384/537 |
| 2011/0222809 | A1* | 9/2011 | Beyfuss | F16C 19/54 384/548 |
| 2012/0308170 | A1* | 12/2012 | Bitzl | F16C 19/54 384/456 |
| 2012/0314986 | A1* | 12/2012 | Bitzl | F16C 19/54 384/584 |

FOREIGN PATENT DOCUMENTS

JP      2008267409 A    * 11/2008  ............ F16C 35/045

* cited by examiner

*Primary Examiner* — Phillip A Johnson
(74) *Attorney, Agent, or Firm* — Bryan Peckjian; SKF USA Inc. Patent Dept.

(57) ABSTRACT

A device includes a first bearing, at least one second bearing, a first bearing-attachment element configured to exert a first force on an outer ring of the first bearing, and at least one second bearing-attachment element configured to exert a second force on an outer ring of the second bearing. The first bearing-attachment element is configured also to exert a third force on the outer ring of the second bearing.

17 Claims, 2 Drawing Sheets

DEVICE INCLUDING ONE FIRST AND AT LEAST ONE SECOND BEARING

CROSS-REFERENCE

This application claims priority to German patent application no. 10 2015 212 437.1 filed on Jul. 2, 2015, the contents of which are fully incorporated herein by reference.

TECHNOLOGICAL FIELD

The present disclosure is directed to an apparatus for securing first and second bearings in a housing, and, more specifically, to an apparatus for securing first and second bearings in a housing wherein a first portion of the device helps secure both the first and second bearings.

BACKGROUND

A device is known that includes a first and a second rolling-element bearing. A bearing-attachment element or apparatus of the device exerts a force in an axial direction of the first bearing on an outer ring of the first bearing. A further bearing-attachment element of the device further exerts a force in an axial direction of the second bearing on an outer ring of the second bearing. The axial directions of the first and second bearings are usually parallel.

SUMMARY

An aspect of the disclosure comprises providing a device of the above-described type with an efficient construction.

Another aspect of the disclosure comprises a support structure or housing with a first bearing, at least one second bearing, a first bearing-attachment element that exerts a first force on an outer ring of the first bearing, and at least one second bearing-attachment element that exerts a second force on an outer ring of the second bearing.

In addition, the first bearing-attachment element also exerts a third force on the outer ring of the second bearing. An efficient construction can be achieved with this design. In particular it makes possible for a stable attachment of the bearing to be achieved with a cost-effective construction. Furthermore it can be achieved that the second bearing-attachment element exerts a lower force on the outer ring of the second bearing than in the case wherein the first bearing-attachment element exerts no force on the outer ring of the second bearing. Furthermore it can be achieved in particular that the second bearing-attachment element can be comprised of unhardened steel. In addition, it can be achieved in particular that the second bearing-attachment element can be comprised of thin metal plate. Furthermore it can be achieved in particular that two shafts that are each supported by a bearing have a small spacing from each other, a spacing smaller than would be possible using conventional bearing-attachment elements.

Preferably the third force has at least one component that is parallel to an axial direction of the second bearing. In this manner, the first bearing-attachment element helps secure the second bearing.

The first bearing-attachment element advantageously includes a formation or projecting structure that contacts the outer ring of the second bearing. A simple force transmission can thereby be achieved.

It is further disclosed that the second bearing-attachment element at most partially encloses (overlies) the second bearing along a circumferential direction of the second bearing. A compact construction can thereby be achieved.

The first bearing-attachment element preferably includes a formation that contacts the outer ring of the second bearing, and the formation contacts the second bearing-attachment element at at least two surface regions or locations. The bearing-attachment elements can thereby be secured against torsions relative to each other. This may be especially effective when the shafts supported by the bearings are configured to rotate in opposite directions.

A first of the surface regions advantageously forms an end region of the second bearing-attachment element with respect to a circumferential direction of the second bearing, and a second of the surface regions forms a second end region of the second bearing-attachment element with respect to the circumferential direction of the second bearing. The bearing-attachment elements can thereby be particularly simply secured against torsions relative to each other.

Another aspect of the disclosure comprises a device comprising a housing having a wall and a first opening in the wall and a second opening in the wall adjacent the first opening. A first bearing is mounted in the first opening, a second bearing is mounted in the second opening, a first bearing-attachment element is mounted on the wall and overlies an outer ring of the first bearing and is configured to prevent the first bearing from moving axially out of the first opening, and a second bearing-attachment element is mounted on the wall and overlies less than 360 degrees of an outer ring of the second bearing and is configured to prevent the second bearing from moving axially out of the second opening. The first bearing-attachment element includes a formation overlying a portion of the outer ring of the second bearing and is configured to help prevent the second bearing from moving axially out of the second opening.

Preferably the first bearing is a cylindrical roller bearing and/or the second bearing a cylindrical roller bearing. Force effects from different sides can thereby be efficiently supported on the respective inner ring.

It is further proposed that the first bearing-attachment element is attached to a drive-housing element of the device and/or the second bearing-attachment element is attached to the drive-housing element of the device. A great stability can thereby be achieved.

The first bearing-attachment element and/or the second bearing-attachment element is advantageously formed from metal plate. In this way a low weight is achieved.

Furthermore a transmission, in particular a motor vehicle transmission, with the device is proposed.

Further advantages arise from the following drawing description. An exemplary embodiment of the disclosure is depicted in the drawings. The drawings, the description, and the claims contain numerous features in combination. The person skilled in the art will also advantageously consider the features individually and combine them into further meaningful combinations.

DETAILED DESCRIPTION

Figure 1:
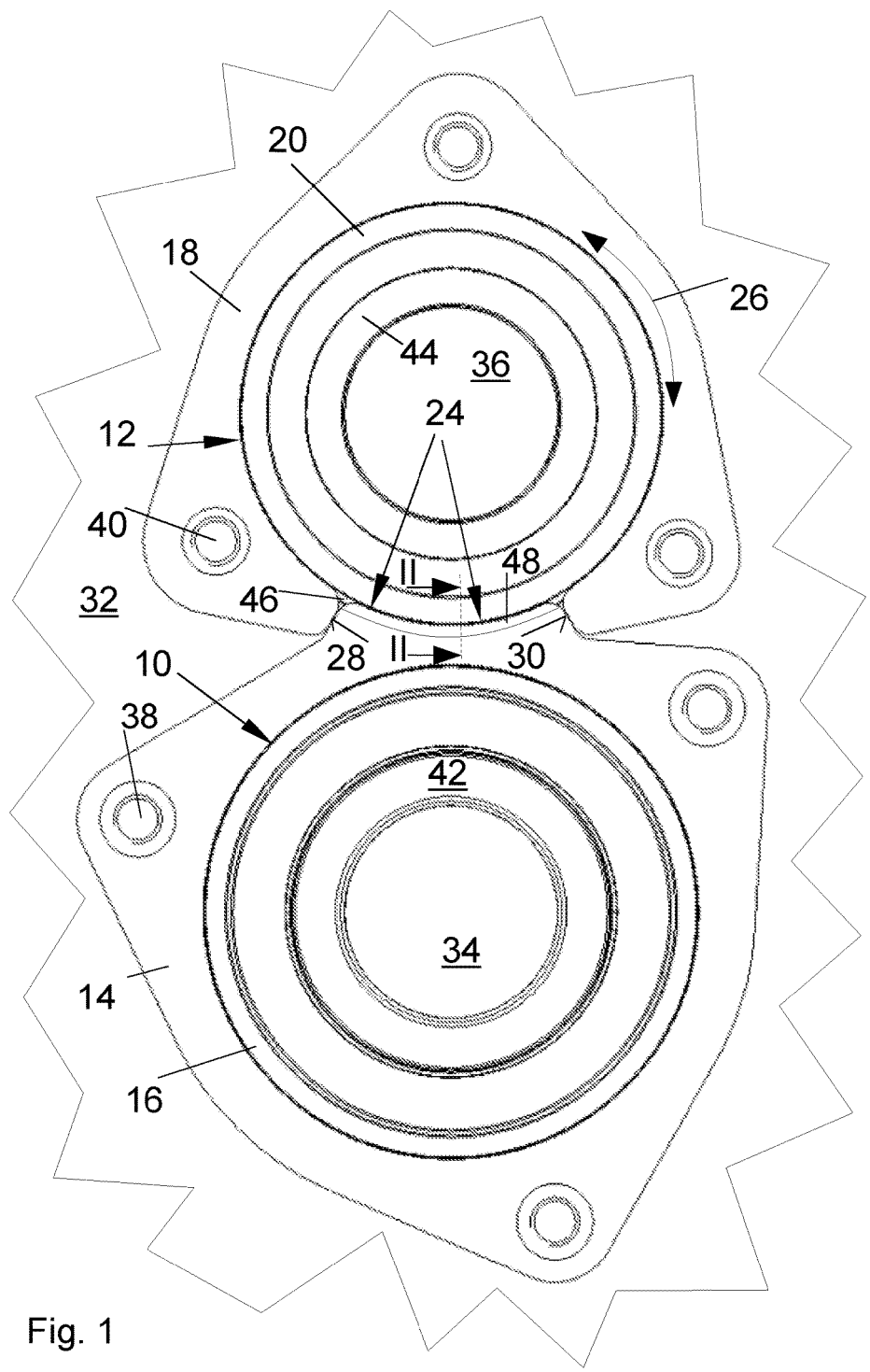
FIG. 1 shows a plan view of an apparatus for securing first and second bearings in a housing or structure.

FIG. 1 shows a plan view of an apparatus according to the present disclosure, which is part of a motor vehicle transmission. In principle the device can also be part of a truck transmission. The device includes a first bearing 10, a second bearing 12, a first bearing-attachment element 14 and a second bearing-attachment element 18. The first bearing-attachment element 14 exerts a first force on an outer ring 16 of the first bearing 10, and the second bearing-attachment element 18 exerts a second force on an outer ring 20 of the second bearing 12. The first force acts in an axial direction of the first bearing, and the second force acts in an axial direction of the second bearing 12. In other words, the first bearing-attachment element 14 and the second bearing-attachment element 18 help secure the first and second bearings 10, 12 against axial movement. The two axial directions are parallel to each other.

An inner ring 42 of the first bearing 10 is attached to a shaft 34 of the transmission, to which gears of the transmission (not shown) are also attached. Furthermore, an inner ring 44 of the second bearing is attached to a shaft 36 of the transmission, to which further gears of the transmission (not shown) are attached.

The first bearing 10 may be a deep groove ball bearing. The second bearing 12 may be a cylindrical roller bearing. In principle it is conceivable that the first bearing and/or the second bearing are formed by rolling-element bearings of another type, for example, it is conceivable that the second bearing is also a deep-groove ball bearing.

The first bearing-attachment element 14 exerts a third force on the outer ring 20 of the second bearing 12, which is directed parallel to an axial direction of the second bearing 12 away from the second bearing-attachment element 18.

The first bearing-attachment element 14 includes a formation 24 (or projection) that contacts the outer ring 20 of the second bearing 18 and transmits the third force. For this purpose the formation 24 abuts on a circle-segment-shaped or arc-shaped region of the outer ring 20 of the second bearing 12.

The second bearing-attachment element 18 encloses the outer ring 20 of the second bearing 12 only partially along a circumferential direction 26 of the second bearing 12; that is, the second bearing-attachment element 18 overlies less than 360 degrees of the outer ring 20 of the second bearing 12. The formation 24 contacts the second bearing-attachment element 18 at two surface regions 28, 30. A first of the surface regions 28 forms a first end region of the second bearing-attachment element 18 with respect to the circumferential direction 26 of the second bearing 12, and a second of the surface regions 30 forms a second end region of the second bearing-attachment element 18 with respect to the circumferential direction 26 of the second bearing 12. The end regions delimit an opening of the second bearing-attachment element 18 into which the formation 24 projects. The second bearing-attachment element 18 is screwed with three screws 40 to a transmission-housing element 32 of the transmission and thereby presses the outer ring 20 of the second bearing 12 against the transmission-housing element 32. In addition the second bearing-attachment element 18 transmits a force on the outer ring 20 to a segment of an annular surface region 46 of the outer ring 20. The surface region 46 is disposed spaced from the two end sides of the outer ring 20.

Furthermore the first bearing-attachment element 14 is screwed with three screws 38 to the transmission-housing element 32 and thereby presses the outer ring 16 of the first bearing 10 against the housing element 32. Because the projection 24 overlies a portion of the outer ring 20 of the second bearing 12, the first bearing-attachment element 14 also exerts the third force on the outer ring 20 of the second bearing 12. The first bearing-attachment element 14 transmits the third force on the outer ring 20 of the second bearing 12 to a further segment of the annular surface region 46 of the outer ring 20.

The two bearing-attachment elements 14, 18 are formed from metal plate.

Figure 2:
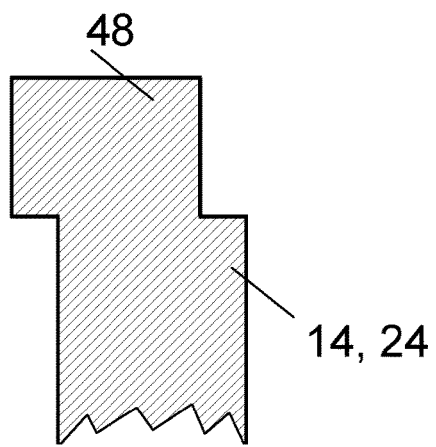
FIG. 2 is a sectional view taken in the direction of line II-II in FIG. 1.

FIG. 2 shows a section through lines II-II in FIG. 1 through the bearing-attachment element 14. The formation 24 includes a step 48 whose underside abuts on the outer ring 20 of the second bearing 12. Despite possible deformations of the bearing-attachment element 14 during screwing to the transmission-housing element 32, the step 48 also effects that the bearing-attachment element 14 exerts the third force on the outer ring 20.

The step 48 can be formed by pushing-through the metal plate of the bearing-attachment element 14.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved apparatuses for attaching bearings to a structure.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMBER LIST

10 Bearing
12 Bearing
14 Bearing-attachment element
16 Outer ring
18 Bearing-attachment element
20 Outer ring
24 Formation
26 Circumferential direction
28 Surface region
30 Surface region
32 Transmission-housing element
34 Shaft
36 Shaft
38 Screw
40 Screw
42 Inner ring
44 Inner ring 46 Surface region
48 Step

What is claimed is:

1. A device comprising:
a first bearing,
a second bearing,
a first bearing-attachment element holding a first bearing and configured to exert a first force on an outer ring of first bearing,
a second bearing-attachment element holding the second bearing and configured to exert a second force on an outer ring of the second bearing,
a convex annular surface region on a circumferential portion of the outer ring of the second bearing, and
a formation in the first bearing attachment element, the formation including a stepped cross-section having a convex annular underside surface that contacts and extends above the convex annular surface region of the outer ring of the second bearing and abuts the second bearing-attachment element at a first surface region and a second surface region, and
the formation is configured to exert a third force on the outer ring of the second bearing.

2. The device according to claim 1, wherein the third force has at least one component that is parallel to an axial direction of the second bearing.

3. The device according to claim 1, wherein the second bearing-attachment element overlies less than an entire circumference of the outer ring of the second bearing, and
the first bearing-attachment element overlies an entire circumference of the outer ring of the first bearing.

4. The device according to claim 1, wherein the first surface region comprises a first circumferential end region of the second bearing-attachment element and the second surface region forms a second circumferential end region of the second bearing-attachment element.

5. The device according to claim 1, wherein the first bearing comprises a cylindrical roller bearing and/or the second bearing comprises a cylindrical roller bearing.

6. The device according to claim 1, wherein the first bearing-attachment element is attached to a transmission-housing element of the device, and the second bearing-attachment element is attached to the transmission-housing element of the device.

7. The device according to claim 1, wherein the first bearing-attachment element and/or the second bearing-attachment element is formed from metal plate.

8. A motor vehicle transmission including the device according to claim 1.

9. The device according to claim 1,
wherein the second bearing-attachment element contacts less than the entire circumference of the second bearing, and
the first bearing-attachment element defines an annular opening that contacts an entire circumference of the first bearing, and
wherein the first surface region comprises a first circumferential end region of the second bearing-attachment element and the second surface region forms a second circumferential end region of the second bearing-attachment element.

10. A device comprising:
a housing including a first opening and a second opening;
a first bearing mounted in the first opening in the housing and a second bearing mounted in the second opening in the housing; and
a first bearing-attachment element overlies an outer ring of the first bearing and secures the first bearing in the first opening;
a second bearing-attachment element overlies an outer ring of the second bearing and secures the second bearing in the housing and the second bearing-attachment element includes a circumferential gap;
a convex annular surface on a circumferential portion of the outer ring of the second bearing corresponds to the circumferential gap; and
a formation in the first bearing-attachment element overlies the convex annular surface of the outer ring of the second bearing and extends into the circumferential gap.

11. The device according to claim 10, wherein the formation further comprises:
a step having a convex underside surface abutting and extending on the convex annular surface of the circumferential portion of the outer ring of the second bearing.

12. The device according to claim 11, wherein the formation directly contacts the convex annular surface of the outer ring of the second bearing and directly contacts first and second circumferentially spaced portions of the second bearing-attachment element.

13. The device of claim 10, wherein the outer ring of the first bearing-attachment element overlies an entire circumference of the outer ring of the first bearing, and the second bearing-attachment element overlies less than an entire surface of the second bearing-attachment element.

14. The device of claim 10, wherein the formation is integrally formed into the first bearing-attachment element and the first bearing-attachment element overlies an entire circumference of the outer ring of the first bearing.

15. A device comprising:
a housing having a wall and a first opening in the wall and a second opening in the wall adjacent the first opening,
a first bearing mounted in the first opening,
a second bearing mounted in the second opening,
a first bearing-attachment element mounted on the wall and overlying an entire circumference of the outer ring of the first bearing and configured to prevent the first bearing from moving axially out of the first opening,
a second bearing-attachment element mounted on the wall and overlying less than 360 degrees of an outer ring of the second bearing and being configured to prevent the second bearing from moving axially out of the second opening, and
a formation integrally formed in the first bearing-attachment element and extending over and abutting a portion of the outer ring of the second bearing and is configured to help prevent the second bearing from moving axially out of the second opening.

16. The device according to claim 15, wherein the second bearing-attachment element includes a circumferential gap and wherein the formation extends into the gap.

17. The device according to claim 16, wherein the formation directly contacts the outer ring of the second bearing and directly contacts first and second circumferentially spaced portions of the second bearing-attachment element.

* * * * *